Sept. 16, 1941.	D. L. McNEAL	2,256,404
FLUID PRESSURE BRAKE MEANS
Filed Aug. 31, 1940
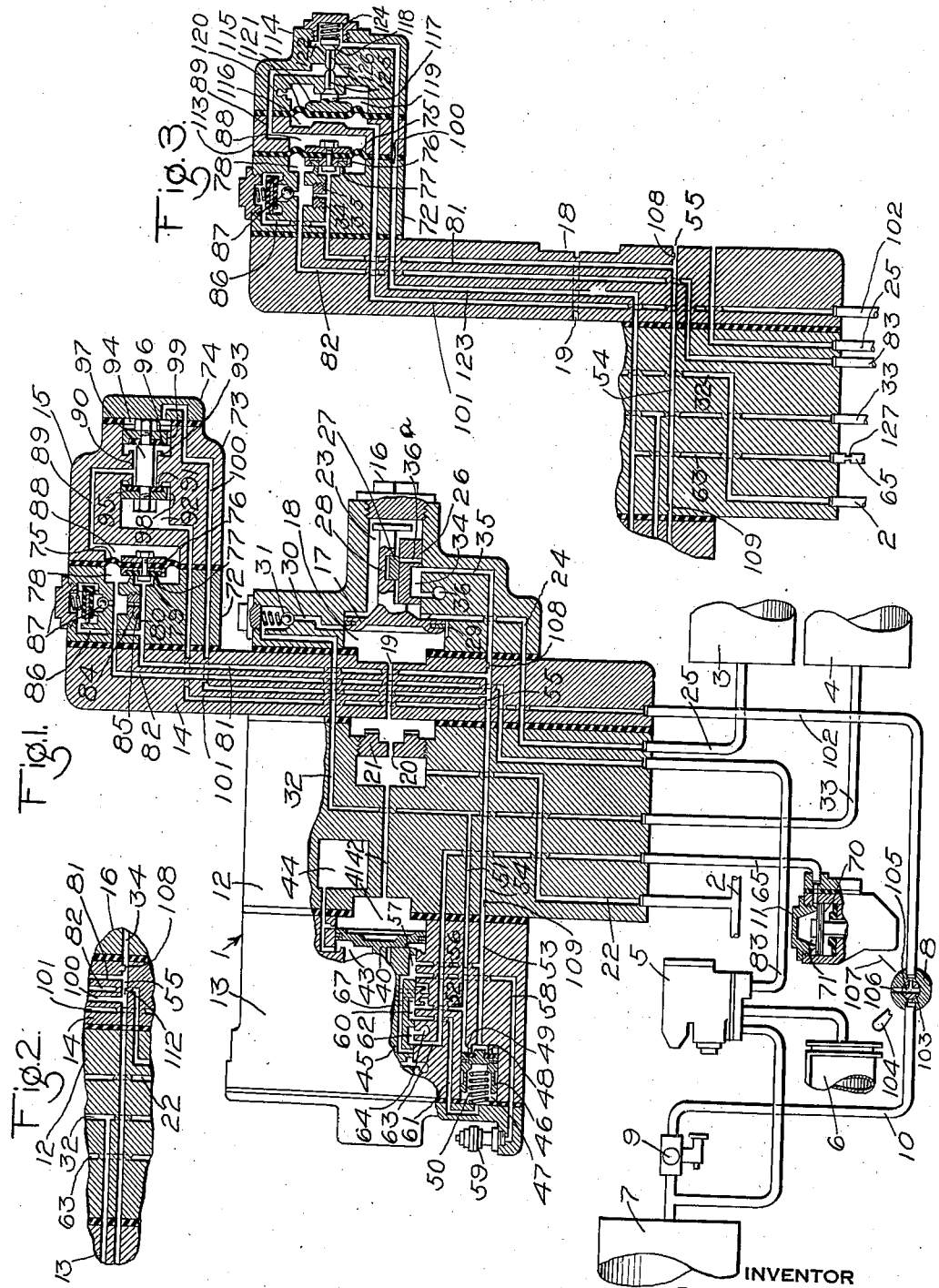
INVENTOR
DONALD L. McNEAL
BY
ATTORNEY Patented Sept. 16, 1941

2,256,404

UNITED STATES PATENT OFFICE 2,256,404

FLUID PRESSURE BRAKE MEANS

Donald L. McNeal, Wilkinsburg, Pa., assignor to The Westinghouse Air Brake Company, Wilmerding, Pa., a corporation of Pennsylvania Application August 31, 1940, Serial No. 354,943

19 Claims. (Cl. 303—40)

This invention relates to fluid pressure brakes and more particularly to fluid pressure brake equipment for railway locomotives.

In Patent No. 2,173,940, issued September 26, 1939, to Ellis E. Hewitt and myself, there is disclosed a locomotive brake equipment embodying electropneumatic means for controlling the brakes on the locomotive and cars of a train electropneumatically on the well known straight air principle and automatic means for controlling the brakes on the locomotive and cars through a brake pipe on the usual automatic principle.

The automatic means on the locomotive is adapted to operate on a service reduction in brake pipe pressure to effect a service application of locomotive brakes and upon an emergency reduction in brake pipe pressure to effect an emergency application of the brakes. This automatic means, which is shown in simple diagrammatic form in the patent, may as stated therein be similar to the control valve device shown and fully described in Patent No. 2,152,257 issued on March 28, 1939, to Ellis E. Hewitt and myself.

Associated with the automatic means above mentioned is an emergency application delay valve device for retarding an emergency application of brakes on the locomotive so that when the locomotive is coupled to a long train its inertia may be utilized to retard the running in of slack in the train and thus avoid possible damage to or wrecking of the train. In short trains the gathering of the proportionately smaller amount of slack is not dangerous at the time an emergency application of brakes is effected, so under such a condition the emergency delay valve device is not needed. Accordingly a two position cock is provided on the locomotive for controlling the delay valve device. This cock has one position for rendering the delay valve device effective for long train operation and another position for rendering the delay valve device ineffective as when the locomotive is hauling a short train.

The emergency delay valve device just mentioned comprises a diaphragm arranged to control a communication through which an emergency application of brakes on short trains is adapted to be effected at the usual emergency rate. When the two position cock is positioned for long train operation this diaphragm is operated to close the communication just described so that a choked communication by-passing the diaphragm becomes effective to control the rate of the emergency application, said choked communication having such flow capacity as to retard the emergency application of the locomotive brakes to the desired degree to provide for the gentle gathering of slack in long trains, as above mentioned.

This choked communication was not intended to retard the rate of a service application of brakes, as was described in Patent 2,173,940. It has been found however that if the delay valve device should be in the position for long train operation when the locomotive is coupled to a short train of for instance five cars, this choked communication does restrict the flow of fluid under pressure for applying the brakes in effecting a service application, so that in effecting such an application the pressure at the supply side of the choked communication builds up above that at the opposite side. Now the supply side of this choked communication is connected in effecting a service application of the brakes to a safety valve as shown and described in Patent 2,152,257 above referred to. This safety valve is provided to limit the degree of a service application of the brakes and as will be apparent will operate under a short train condition just mentioned to limit by venting fluid under pressure the increase in pressure at the supply side of the choked communication, during which time the pressure at the opposite side of the choked communication, which determines the degree of brake application, is building up. The fluid under pressure thus vented through the safety valve comes from an auxiliary reservoir and it will therefore be apparent that any loss of such fluid results in a reduction in the degree of brake application which should be obtained for the selected reduction in brake pipe pressure, and this is undesirable.

The principal object of the invention is therefore the provision of an improved emergency delay valve device for the locomotive brake equipment above described which is adapted to obviate the loss of fluid under pressure and the delay in obtaining a service application of brakes under conditions such as just described.

Other objects and advantages will be apparent from the following more detailed description of the invention.

In the accompanying drawing; Fig. 1 is a diagrammatic view, partly in section and partly in outline, of a portion of a locomotive brake equipment embodying the invention; Fig. 2 is a diagrammatic view of a portion of a control valve device shown in Fig. 1 and embodying a modification of the invention; and Fig. 3 is a diagrammatic view of a portion of a control valve device shown in Fig. 1 embodying still another modification of the invention.

DESCRIPTION OF EMBODIMENT IN FIG. 1

The locomotive brake equipment shown in Fig. 1 may be similar to that disclosed in Patent 2,173,940 above referred to, only those parts being shown however which are required for a clear understanding of the invention.

As shown, the locomotive brake equipment comprises an automatic brake controlling valve device 1 adapted to be controlled through the medium of a brake pipe 2, an auxiliary reservoir 3, an emergency reservoir 4, a pressure relay valve device 5, a brake cylinder device 6, a main reservoir 7, a delay cock 8 arranged convenient for operation by the engineer of the locomotive, a feed valve device 9 of any suitable structure adapted to operate to supply fluid at a desired reduced pressure to a pipe 10 from the main reservoir 7, said pipe leading to one side of the delay cock 8, and a sanding valve device 11.

The automatic brake controlling valve device 1 comprises a pipe bracket 12, an emergency valve device 13 mounted on one face of said bracket, a filler piece 14 mounted on an opposite face of said bracket, an emergency delay valve device 15 carried by said filler piece and a service or triple valve device 16 also carried by said filler piece.

The service valve device 16 comprises, merely for the purpose of illustration, a piston 17 having at one side a chamber 18 connected through a passage 19 in the filler piece 14, a passage 20 provided in a nut 21 mounted in the bracket 12 and a passage 22 with the brake pipe 2. The piston 17 has at its opposite side a valve chamber 23 connected by a passage 24 extending through the filler piece 14 and bracket 12 to a pipe 25 leading to the auxiliary reservoir 3. Disposed in the valve chamber 23 is a main slide valve 26 and an auxiliary slide valve 27 mounted on said main slide valve, the piston 17 being provided with a stem 28 for controlling the two slide valves in the usual manner.

The parts of the service valve device 16 have a release position, as shown in the drawing, which they may assume when the brake pipe 2 is charged with fluid under pressure and the brakes are released and in which a feed groove 29 establishes communication around the piston 17 from chamber 18 to the chamber 23 through which fluid under pressure from the brake pipe is adapted to flow to the chamber 23 and thence to the auxiliary reservoir 3 for charging same. Also in the release position of piston 17 a passage 30 is open to chamber 18 so that fluid under pressure supplied from the brake pipe to said chamber may flow to the emergency reservoir 4 for charging same by way of said passage, past a check valve 31 through passage 32 in filler piece 14 and bracket 12 and thence through pipe 33. In the release position of the main slide valve 26 a cavity 34 therein connects a passage 35 to an atmospheric port 36 through which communication a release of brakes after an automatic application is adapted to be effected.

The piston 17 is adapted to respond to a reduction in pressure in brake pipe 2 and thereby in piston chamber 18 at either a service or an emergency rate to move the slide valves 26 and 27 to an application position in which a service port 36a in the main slide valve is uncovered by the auxiliary slide valve 27 and registers with passage 35 for supplying fluid under pressure from the auxiliary reservoir 3 to said passage for effecting an application of the brakes. Upon a subsequent increase in brake pipe pressure for effecting a release of brakes the parts of the triple valve device are adapted to be returned to their release position shown in which the auxiliary and emergency reservoirs will be recharged with fluid under pressure from the brake pipe 2 and the passage 35 will be connected with the atmospheric port 36 for effecting a release of brakes as above mentioned.

The emergency valve device 13 comprises a piston 40 having at one side a chamber 41 connected to the brake pipe through a passage 42 and the passage 22. The piston 40 has at the opposite side a valve chamber 43 connected to a quick action chamber 44 and containing a main slide valve 45 connected to the piston 40 for movement thereby upon an emergency reduction in brake pipe pressure, the slide valve 45 remaining in the release position shown, at all other times.

The emergency valve device 13 further comprises a high pressure valve preferably in the form of a valve piston 46 having at one side a chamber 47 and provided on its opposite face with a valve seal 48 for engagement with an annular seat rib 49 provided in the casing. A spring 50 in chamber 47 acts on the valve piston 46 for urging same into sealing engagement with the seat rib 49.

The annular space surrounding the seat rib 49 at the one face of the valve piston 46 is connected by passages 51 and 32 and pipe 33 to the emergency reservoir 4 so that fluid at emergency reservoir pressure is always present in said space. The passage 51 is also connected by a passage 52 to the seat of the emergency slide valve 45.

The seat rib 49 encircles a space at the one face of valve piston 46 which is connected to a passage 53 communicating through a passage 54 in the pipe bracket 12 with a passage 55 in the filler piece 14, the passage 35 in the service application valve device 16 also communicating with the passage 55.

In the emergency valve device 13 the passage 53 is connected by a passage 56 to the seat of the emergency slide valve 45. The emergency slide valve has a cavity 57 which in the release position of said valve, shown in the drawing, connects the passage 56 to a passage 58 which leads to a safety valve device 59. The slide valve 45 also has a cavity 60 which in the release position of said valve connects passage 52, which is constantly supplied with fluid under pressure from the emergency reservoir 4, to a passage 61 leading to chamber 47 at the opposite face of the high pressure valve piston 46. Emergency reservoir pressure is thus provided in valve piston chamber 47 at all times when the emergency slide valve 45 is in its normal position shown so as to render spring 50 effective to maintain the valve piston 46 seated against the seat rib 49 and thereby prevent the flow of fluid under pressure from the emergency reservoir past said valve piston to the passage 53. The slide valve 45 also has a cavity 62 which in the release position of the valve connects a passage 63 with an atmospheric passage 64. The passage 63 is connected to a pipe 65 which leads to the sanding valve device 11.

It is well known that in an emergency valve device of the type shown and above described the main slide valve 45 is adapted to remain in its normal position shown when the brakes on the locomotive are released as well as upon a service reduction in pressure in the brake pipe 2. However upon an emergency reduction in pressure in the brake pipe and thereby in piston chamber 41 the piston 40 is adapted to be operated by the pressure of fluid in valve chamber 43 and quick action chamber 44 to move the slide valve 45 from the position shown to an emergency position. In the emergency position the cavity 62 is adapted to connect the passage 61 to the atmospheric vent passage 64 to thereby vent the fluid under pressure from chamber 47 at the spring side of the high pressure valve piston 46. When this occurs fluid at emergency reservoir pressure acting on the opposite face of the valve piston 46 outside of the annular seat rib 49 is adapted to move said valve piston away from said seat rib to thereby permit fluid at emergency reservoir pressure to flow from passage 51 to the passage 53 and thence through passage 54 to passage 55 in the filler piece 14. The fluid pressure supplied by the service valve device 16 to passage 35 upon an emergency reduction in brake pipe pressure also flows to the passage 55 from which the fluid pressure supplied by both the service and emergency valve devices is adapted to flow to the relay valve device 5 for effecting an emergency application of brakes, as will be later described in further detail.

In the emergency position of slide valve 45 cavity 57 is moved out of registry with passage 58 and said passage is lapped so that the safety valve device 59 is rendered inoperative to limit the pressure of fluid supplied to passage 53 for effecting an emergency application of brakes.

The slide valve 45 also has a passage 67 connected at one end to the cavity 57 and which cooperates therewith in emergency position of said valve to establish a communication between the passages 56 and 63 to thereby supply fluid under pressure to pipe 65 for actuating the sand valve device 11.

The sand valve device 11 comprises a casing containing a piston 70 having at one side a chamber 71 connected to pipe 65 for receiving fluid under pressure therefrom in the emergency position of the emergency valve device 11 to effect movement of the piston 70 in a downwardly direction, as viewed in the drawing, to effect sanding of the track rails. When the emergency valve device 13 is in its normal position shown, piston chamber 71 in the sand valve device 11 is vented through pipe 65 under which condition the sanding piston 70 is adapted to occupy the position shown in which the supply of sand for sanding of the rails is cut off. The sand valve device 11 and its association with the emergency valve device 13 as shown in Fig. 1 is in no way pertinent to the embodiment of the invention being described but is pertinent to the embodiment shown in Fig. 3 to be later described.

The emergency delay valve device 15 comprises a casing section 72 secured to the filler piece 14, a casing section 73 mounted on the section 72, and a cover 74 secured to the section 73.

A flexible diaphragm 75 is clamped between the two sections 72 and 73 and has secured to one face a valve 76 adapted to engage an annular seat rib 77. The diaphragm 75 is open at one face to a chamber 78 provided around the seat rib 77. Within the seat rib 77 is an annular recess 79, the valve 76 being provided to open and close communication between said recess and the chamber 78.

The recess 79 is connected by way of passages 80 and 81 to the passage 55 in filler piece 14. The chamber 78 is connected by a passage 82 and a pipe 83 to the relay valve device 5. In the casing section 72 the passages 80 and 82 are in permanent two-way communication through a restricted emergency delay port 84 in a choke plug 85. The passage 82 is also connected to the passage 80 through an unrestricted release communication 86 containing check valves 87, said valves being operative to prevent the flow of fluid in the direction from passage 80 to passage 82, as will be apparent.

At the opposite face of the diaphragm 75 is a chamber 88 which in the casing section 73 is connected through a passage 89 to a bore 90. The bore 90 opens through an annular seat rib 91, at one end of the bore to a chamber 92 and through a seat rib 93 at the opposite end of the bore to a chamber 94. A valve 95 is slidably mounted in chamber 92 and is adapted to engage the seat rib 91 for closing communication between said chamber and the bore 90. A valve 96 is slidably mounted in chamber 94 for engagement with seat rib 93 to close communication between said chamber and the bore 90. The valves 95 and 96 are connected for movement in unison by a stem 97 which is of smaller diameter than the bore and which extends therethrough, said stem being of such length that only one of the valves can be seated at a time.

The valve 95 is provided with one or more slots 98 providing communication between the opposite sides of the valve, and for the same purpose similar slots 99 are provided in the valve 96.

The chamber 94 is connected by a passage 100 to passage 55 in the filler piece 14. The chamber 92 is connected by a passage 101 and pipe 102 to the delay cock 8.

The delay cock 8 comprises a casing containing a rotary plug valve 103 which is adapted to be turned by a handle 104 to either a non-delay position in which it is shown or to a delay position in which said handle will occupy the position indicated by line 107. The plug valve 103 has a passage 105 adapted in the non-delay position to establish a communication between pipe 102 and a port 106 in the casing for venting said pipe and thereby chamber 92 in the delay valve device 15. In the delay position of plug valve 103 the passage 105 in the plug valve is adapted to connect the pipes 10 and 102 so that fluid under pressure supplied by the feed valve device 9 to the pipe 10 may flow to the chamber 92 in the delay valve device 15 for thereby moving the valves 95 and 96 to the position shown.

The relay valve device 5 may be of any desired well known type adapted to operate upon the supply of fluid under pressure to pipe 83 to supply fluid at a corresponding pressure to the brake cylinder device 6 for applying the brakes on the locomotive and upon the release of fluid under pressure from said pipe to effect a corresponding release of fluid under pressure from the brake cylinder device 6 for releasing the brakes on the locomotive. Devices of this type are so well known that a further description thereof is not essential in the present application.

OPERATION OF EMBODIMENT IN FIG. 1

*Delay cock 8 in the non-delay position*

If it is desired to effect a service application of brakes a service reduction in pressure in brake pipe 2 is effected by the usual service operation of the engineer's brake valve device (not shown) and the service application valve device 16 responds thereto to supply fluid under pressure from the auxiliary reservoir 3 to passage 35 through which it flows to passage 55 in the filler piece 14. Fluid under pressure thus supplied to passage 55 flows therefrom through passages 81 and 80 to the restricted port 84 in the choke plug 85 in the delay valve device 15 through which port it may flow to passage 82 and thence to the relay valve device 5 for operating same to supply fluid at a corresponding pressure to the brake cylinder device 6 for applying the brakes on the locomotive.

The emergency slide valve 45 remains in its normal position shown in effecting a service application of the brakes so that the safety valve device 59 is connected to passage 55 and said safety valve device is so adjusted as to permit the build up of pressure in said passage for operating the relay valve device 5 to a certain desired degree and to then operate to prevent any further increase so as to thereby limit the degree of a service application of brakes on the locomotive as determined by the pressure of fluid supplied to the brake cylinder device 6.

On long trains the rate of reduction in brake pipe pressure obtained from the usual service operation of the engineer's brake valve device is relatively slow and the service application valve device 16 operates to limit the rate of reduction in auxiliary reservoir pressure in valve chamber 23 by flow to passage 35 to a correspondingly slow rate as governed by the amount which the service port 36a is opened or throttled by the auxiliary slide valve 27. Under this condition the restricted port 84 in choke plug 85 offers substantially no restriction to the flow of fluid under pressure to the relay valve device 5. Thus the pressure of fluid will build up in the passage 82 and in the relay valve device 5 substantially with and in proportion to the increase in pressure in passage 81 which is in communication with the safety valve device 59, as a result of which the safety valve device will not operate to release any fluid pressure until the desired pressure is obtained in the relay valve device 5.

However, in the case of a relatively short train, such as five cars, the pressure in brake pipe 2 will reduce at a faster rate in response to the usual service operation of the engineer's brake valve device than on longer trains, in which case the service port 36a in the main slide valve 26 of the service application valve device 16 will be fully uncovered by the auxiliary slide valve 27 and a service choke 108 then becomes effective to limit the rate at which fluid may flow from the auxiliary reservoir to passage 55 for effecting a service application of brakes. However in short trains such as five cars, the rate at which fluid flows through the choke 108 to passage 55 is such that the emergency delay choke 84 would act to restrict the flow from passage 81 to passage 82 so that the pressure of fluid in passage 81, which is in communication with the safety valve device 59, would tend to increase more rapidly than that in passage 82 which is connected to the relay valve device 5. If such should occur then the safety valve device 59 would operate to vent fluid under pressure from passage 55 prior to the pressure in passage 82 and in the relay valve device 5 becoming built up to the setting of the safety valve device, in which case an undesired loss of fluid under pressure from the auxiliary reservoir would occur with a consequent reduction in the degree of pressure which should be obtained in the relay valve device 5, and consequently in the brake cylinder device 6, for the selected degree of reduction in brake pipe pressure.

This restricting of the supply of fluid under pressure to the relay valve device 5 and the undesired loss of fluid under pressure through the safety valve device 59 is avoided however, in effecting a service application of brakes in the present apparatus in the following manner.

It will be noted that the pressure of fluid supplied to passage 81 flows to the recess 79 and acts therein on the valve 76. With the delay cock 8 in the non-delay position shown, chamber 88 at the opposite side of the diaphragm 75 is open to the atmosphere past the valve 95, which will be unseated at this time, and thence through pipe 102 so that, as will be apparent, the pressure of fluid acting in recess 79 on the valve 76 will unseat said valve to thereby open the by-pass between passages 81 and 82 around the emergency delay port 84 in the plug 85 and through this by-pass the pressure of fluid in passage 82 and thereby in the relay valve device 5 will increase with the pressure in passage 81 and thereby at the safety valve device 59. The safety valve device will therefore not operate to vent fluid under pressure until the pressure acting at the relay valve device 5 is built up to the setting of the safety valve device. By this arrangement the emergency delay port 84 in the delay valve device 15 is prevented from restricting the rate of a service application of brakes and the safety valve device 59 is rendered effective to control the pressure of fluid at the relay valve device 5 so as to avoid premature operation of the safety valve device therewith a consequent loss of fluid from the auxiliary reservoir and loss in the degree of brake application obtainable on the locomotive for a chosen degree of reduction in brake pipe pressure at a service rate.

As above described diaphragm chamber 88 in the delay valve device 15 is adapted to be vented past the unseated valve 95 and through the delay cock 8 when in the non-delay position shown. In the drawing the valve 95 is shown seated thus closing communication between the chamber 88 and pipe 102 leading to the delay cock 8. If the valve 95 should be seated at the time a service application of brakes is effected with the delay cock 8 in the non-delay position, said valve will be promptly unseated in the following manner.

It will be noted that fluid under pressure supplied by the service application valve device 16 to passage 55 also flows through passage 109 to chamber 94 at the outer face of the valve 96. The rate at which fluid under pressure will thus be supplied to chamber 94 at the right hand side of valve 96 is adapted to exceed the rate at which fluid under pressure can flow through the slots 99 to the opposite face of said valve so that a differential of pressures will be obtained on said valve for effecting movement thereof in the direction of the left hand and into engagement with seat rib 93. This movement of the valve 96 is adapted to unseat the valve 95 to thereby open the venting communication from the diaphragm chamber 88 above described.

If it is desired to effect an emergency application of the brakes on the locomotive the pressure of fluid in brake pipe 2 is reduced at an emergency rate and the service application valve device 16 operates in the same manner as above described to supply fluid under pressure from the auxiliary reservoir to passage 35 and thence through the service choke 108 to passage 55. At the same time as the service application valve device 16 operates the emergency valve device 13 also operates, the piston 40 thereof responding to the reduction in brake pipe pressure to move the slide valve 45 to its emergency position.

In the emergency position of slide valve 45 cavity 62 therein connects passage 61 leading to the spring side of the high pressure valve piston 46 to the atmospheric port 64 so that the fluid under pressure in chamber 47 is vented to the atmosphere. When this occurs emergency reservoir pressure acting on the opposite face of the valve piston 46 outside of the seat rib 49 moves said valve piston away from said seat rib and thereby connects passage 51 from the emergency reservoir 4 to passage 53 so that fluid under pressure from said reservoir is permitted to flow to passage 53 and thence through passage 54 to passage 55 at a rate determined by an emergency choke 109.

Fluid under pressure is thus supplied to the passage 55 from both the auxiliary and emergency reservoirs and thence flows through the passage 81 to the emergency delay port 84 in choke 85 and also to recess 79. Chamber 88 at the opposite face of diaphragm 75 is at this time open to the atmosphere through the delay cock 8 so that the pressure of fluid in recess 79 acts to unseat the valve 77. The fluid under pressure supplied to passage 81 then flows to passage 82 past valve 76 as well as through the restricted delay port 84, the rate of supply to passage 82 being limited by the combined flow capacities of the service choke 108 and emergency choke 109. Fluid thus supplied to passage 82 flows to the relay valve device 5 and actuates same to supply fluid under pressure to the brake cylinder device 6 at a corresponding rate for thereby effecting an emergency application of the locomotive brakes.

In the emergency position of slide valve 45 passage 58 leading to the safety valve device 59 is disconnected from passage 53 so that said safety valve is ineffective to limit the pressure obtained in the relay valve device 5 for actuating same. Also in the emergency position of slide valve 45 the port 67 and cavity 57 connects passage 56 to passage 63 so that fluid under pressure will flow from passage 53 to pipe 65 and thence to piston chamber 71 in the sanding valve device 11 for effecting operation of said device to sand the rails under the locomotive.

*Delay cock 8 in delay position*

With the delay cock 8 in the delay position in which the handle 104 will occupy the position indicated by the line 107, the plug valve 103 will be conditioned to disconnect pipe 102 from the atmospheric vent port 106 and to connect same through the port 105 in said valve to the feed valve pipe 10. Fluid at feed valve pressure is then supplied from the pipe 10 to the pipe 102 and thence through passage 101 to chamber 92 at the left hand side of check valve 95 in the emergency delay valve device 15.

The rate at which fluid under pressure is thus supplied to the chamber 92 at the left hand side of the valve 95 exceeds the flow capacity of slots 98 to such an extent that a differential of fluid pressures will be created on said valve to ensure movement thereof in the direction of the right hand and into sealing engagement with the seat rib 91. In this position of valve 95 diaphragm chamber 88 is opened past the valve 96 to passage 100 leading to passage 55 in the filler piece 14 so that in effecting either a service or an emergency application of brakes fluid pressure supplied to passage 55 is adapted to flow to the diaphragm chamber 88 at the right hand side of diaphragm 75 at the same time as supplied through passage 81 to the recess 79 at the opposite side of the diaphragm.

In effecting a service application of brakes the rate at which fluid under pressure is supplied from the auxiliary reservoir to passage 55 and thereby to passage 81 on a long train is such with respect to the flow capacity of port 84 in the plug 85 that the pressure in passage 82 will build up substantially with that in passage 81 so that the position of diaphragm 75 and check valve 76 associated therewith under this condition is immaterial.

However, on a relatively short train of for instance five cars the rate at which fluid is supplied by the service valve device 16 to passage 81 is faster than on a long train and such that the port 84 in choke plug 85 would act to restrict the flow to passage 82, as hereinbefore described. Under this condition it will be noted that with the delay cock 8 in delay position the pressure in diaphragm chamber 88 will tend to build up substantially with that in recess 79 at the opposite side of the diaphragm, while the pressure in chamber 78 at said opposite side of the diaphragm will start to build up at a slower rate due to the restricting effect of the emergency delay port 84. However, as has been determined from actual operation of the mechanism, the rate of increase in chamber 78 is sufficiently rapid with respect to the capacity of the service choke 108 that an insufficient differential of forces is provided on the diaphragm 75 to hold the valve 76 seated, which is probably due to the greater resistance to flow in the communication leading to chamber 88. The by-pass between passages 81 and 82 past valve 76 and around the restricted port 84 in choke plug 85 is consequently opened to provide for the pressure in passage 82, and thereby that in the relay valve device 5, increasing substantially with that in passage 81 which acts at the safety valve device 59. By thus providing for the opening of the delay check valve 76 with the delay cock 8 in the delay position in effecting a service application of brakes it will be apparent that the port 84 in choke 85 will not restrict the rate of a service application of the brakes on a short train and the safety valve device 59 will not prematurely operate since it will in effect be directly subject to the build up of pressure in relay valve device 5.

In effecting an emergency application of brakes however the rate at which fluid under pressure is supplied to the passage 81 and to diaphragm chamber 88 by operation of both the service application valve device 16 and emergency application valve device 13 so exceeds the rate at which the emergency delay port 84 in choke plug 85 permits the flow of fluid to passage 82 and diaphragm chamber 78 that a sufficient differential of fluid pressure is promptly obtained on the diaphragm 75 for holding the check valve 76 firmly seated. The supply of fluid under pressure to the relay valve device 5 and thereby to the brake cylinder device 6 will therefore be delayed to provide the desired delayed emergency application of locomotive brakes as controlled by the capacity of the emergency delay port 84.

The check valve 76 will be forced against its seat as just described until the emergency application of brakes is substantially completed at which time the fluid pressures in the auxiliary and emergency reservoirs 3 and 4 will become equalized with that acting in the relay valve device 5 and in valve chambers 88 and 78 at opposite sides of the diaphragm 75. This equalization of pressures on the opposite sides of diaphragm 75 is however immaterial since it does not occur until after the application of brakes is substantially completed.

DESCRIPTION OF EMBODIMENT OF INVENTION SHOWN IN FIG. 2

If desired, the emergency choke 109 shown in Fig. 1 may be dispensed with and a choke 112 having the same flow capacity as choke 109 may be provided in passage 55 between the connections of said passage with passages 81 and 100, the choke 112 functioning in this location to control the rate at which fluid is supplied from the emergency reservoir to the relay valve device 5 by operation of the emergency valve device 13 in effecting an emergency application of the brakes the same as in the embodiment shown in Fig. 1, as will be apparent.

It is to be noted however that in effecting a service application of brakes with the delay cock 8 in delay position the choke 112 is effective to restrict the flow of fluid to passage 100 and thereby to diaphragm chamber 88, and this ensures a faster rate of pressure build up in recess 79 and diaphragm chamber 78 than obtained in diaphragm chamber 88. The choke 112 therefore provides for obtaining a sufficient differential of pressures on the opposite sides of diaphragm 75 for promptly unseating the valve 76 in effecting a service application of brakes with the delay cock in the delay position so as to avoid restricting the rate of the brake application as well as the undesired operation of the safety valve device 59, above described.

In effecting an emergency application of brakes with the delay cock 8 in the delay position, the choke 112 will also act to insure an increase in pressure in diaphragm chamber 88 ahead of that in the recess 79 and chamber 78 at the opposite side of the diaphragm so as to thereby provide an adequate differential of pressures on the diaphragm 75 for firmly holding the check valve 76 seated, as desired to obtain a delay emergency application of the locomotive brakes.

With the present service and emergency rates of brake application employed it has been determined that the structure shown in Fig. 1 will accomplish the same results as that shown in Fig. 2, that is, there is no need for eliminating the emergency choke 109 already provided in the pipe bracket 12 of these devices and adding a choke 112 to the filler piece 14 as shown in Fig. 2. Any change in the present rates of brake application, such as increasing the service rate, might however prevent the structure shown in Fig. 1 from accomplishing the desired result, under which condition the structure shown in Fig. 2 could be employed, since the location of choke 112 ensures the desired operation of the emergency delay valve device 15 under all service and emergency conditions.

DESCRIPTION OF EMBODIMENT OF INVENTION SHOWN IN FIG. 3

In this embodiment of the invention different means are provided for controlling the operation of the diaphragm 75, said means being embodied in a casing section 113 secured to the casing section 72 of the emergency delay valve device 15 and a casing section 114 secured to the section 113; the two sections 113 and 114 replacing the sections 73 and 74 shown in Fig. 1. The casing section 113 cooperates with the casing section 72 to clamp the flexible diaphragm 75 in place and to provide at its right hand place the chamber 88, while clamped between the casing sections 113 and 114 is another diaphragm 115 having at one face a chamber 116 which is connected by way of passage 101 and pipe 102 to the delay cock 8.

The diaphragm 115 is provided for controlling the position of two oppositely seating poppet valves 117 and 118. The valve 117 is contained in a chamber 119 provided at the opposite side of diaphragm 115 and which is in constant communication with the atmosphere through a vent port 120. A follower plate 121 is interposed between the diaphragm 115 and valve 117. The valve 118 is contained in a chamber 122 which is connected by a passage 123 to the sanding passage 63 in the pipe bracket 12. The valves 117 and 118 are provided with oppositely arranged stems 125 which engage each other in a chamber 126. A spring 124 in chamber 122 acts on the valve 118 for seating same and for at the same time unseating the valve 117, said valves being simultaneously movable in the opposite direction by diaphragm 115. The chamber 126 is connected to the diaphragm chamber 88 by passage 89.

OPERATION OF EMBODIMENT OF INVENTION SHOWN IN FIG. 3

When the delay cock 8 is in the non-delay position diaphragm chamber 116 is vented to the atmosphere and spring 124 acts to seat the valve 118 and unseat the valve 117. With the valve 117 unseated diaphragm chamber 88 at one side of the emergency delay diaphragm 75 is open to the atmosphere through passage 89, chamber 126, past said valve to chamber 119 and thence through the vent port 120. With the chamber 88 thus at atmospheric pressure the diaphragm 75 is adapted to operate upon either a service or an emergency application of brakes to open the communication around the emergency delay choke 84 to provide the desired service and emergency rates of build up in pressure through pipe 83 on the relay valve device 5 and to prevent, in effecting a service application of brakes premature operation of the safety valve device 59 and consequently undesired loss of fluid under pressure from the auxiliary reservoir with a resultant partial loss of braking power on the locomotive, as hereinbefore described.

If it is desired to delay an emergency application of brakes on the locomotive the delay cock 8 is turned from the non-delay position shown to the delay position above described in which fluid under pressure is supplied from the pipe 10 through pipe 102 to diaphragm chamber 116. This pressure acting on the diaphragm 115 deflects same in the direction of the right hand and seats the valve 117 and unseats the valve 118. With valve 118 unseated chamber 88 at one side of the emergency delay valve diaphragm 75 is connected to passage 100 in the delay valve device which passage is connected by passage 123 in the filler piece 14 to passage 63 connecting the emergency valve device 13 to the sand valve device 11.

The passage 63 is open to the atmosphere through cavity 62 in the emergency slide valve 45 when in its normal release position shown in Fig. 1 so that chamber 88 in the emergency delay valve device 15 is vented to the atmosphere at all times except when the emergency slide valve 45 moves out of its normal position to its emergency position. With the diaphragm chamber 88 thus at atmospheric pressure at the time a service application of brakes is effected it will be apparent that the delay diaphragm 75 will operate to open the by-pass around choke 84 in case the pressure in passage 81 tends to exceed that obtained in passage 82, due to the restricting effect of the emergency delay choke 84, so as to thereby prevent retarding the service application of brakes and also prevent operation of the safety valve device 59 prior to the pressure acting on the relay valve device 5 building up to the adjustment of said safety valve device.

When the emergency valve device 13 moves to emergency position in effecting an emergency application of brakes, however, the fluid pressure supplied to passage 63 for operating the sand valve device 11 also flows through the passages 123 and 100, past the valve 118 and thence through passage 120 to diaphragm chamber 88. This supply of fluid to chamber 88 is not influenced by the emergency choke 109, and a choke 127 is provided to hold back the supply of fluid through pipe 65 to the sand valve device 11 so as to thereby ensure a prompt build up of pressure in diaphragm chamber 88 to operate the diaphragm to hold the delay valve 76 in sealing engagement with the seat rib 77. With the valve 76 thus promptly seated upon initiating an emergency application of brakes it will be apparent that the supply of fluid from the service application valve device 16 and emergency valve device 13 to the relay valve device 5 will be controlled by the emergency delay choke 84 to provide the desired retarded or delayed build up in pressure in the brake cylinder device 6 for delaying the application of locomotive brakes.

CONCLUSION

From the foregoing it will be apparent that the invention provides for delaying an emergency application of brakes on a locomotive, where such is desired, in order that the inertia of the locomotive may be effective to retard the gathering of slack in a long train. The flow of fluid under pressure for effecting a service application of brakes on the locomotive is adapted to occur through the same communication that provides for delaying an emergency application of brakes, but the parts are so designed and arranged that the service application will not be retarded even on a short train where a maximum rate of service application is obtained. By not retarding a service application of brakes a loss of air from the auxiliary reservoir through the usual safety valve device and a consequent loss of braking power on the locomotive for a certain reduction in brake pipe pressure is avoided. The improved delay means may be controlled in various manners as shown in the drawing and as above described in accordance with the conditioning of a manually operable delay valve which is located on the locomotive convenient for adjustment by the engineer.

While several embodiments of the invention have been shown and described in detail it is not the intention to limit the scope to these embodiments or otherwise than by the terms of the appended claims.

Having now described my invention, what I claim as new and desire to secure by Letters Patent, is:

1. In a fluid pressure brake, in combination, a brake pipe, a communication to which fluid under pressure is adapted to be supplied for effecting an application of the brakes at a rate dependent upon the rate of such supply, brake controlling means operative upon a reduction in brake pipe pressure to supply fluid under pressure for supply to said communication at a rate dependent upon the rate of brake pipe reduction, choke means disposed between said brake controlling means and said communication and operative to restrict the flow of fluid supplied from said brake controlling means to said communication, means for establishing a by-pass communication around said choke means to provide for flow of fluid to said communication in accordance with the rate of supply of fluid under pressure by said brake controlling means, and delay valve means controlled by two opposing fluid pressures, both of which are established by said brake controlling means, said delay valve means being operative to close said by-pass communication when said brake controlling means operates in response to an emergency rate of reduction in brake pipe pressure, and being operative to open said by-pass communication when said brake controlling means, in response to a reduction in brake pipe pressure at a rate less than an emergency rate, operates to supply fluid under pressure at a rate the flow of which to said communication would be restricted by said choke means.

2. In a fluid pressure brake for a train, in combination, a brake pipe, a communication to which fluid under pressure is adapted to be supplied for effecting an application of the brakes at a rate dependent upon the rate of such supply, brake controlling means operative upon a reduction in brake pipe pressure to supply fluid under pressure to said communication at a rate dependent upon the rate of brake pipe reduction, choke means disposed between said brake controlling means and said communication and operative to restrict the rate of flow of fluid under pressure supplied to said communication by said brake controlling means, and means for establishing a by-pass communication around said choke means to provide for flow of fluid to said communication in accordance with the rate of supply of fluid under pressure by said brake controlling means, said last means benig governed by two opposing fluid pressures, one of which is that present in said communication and the other of which is that present in a chamber, said parts being so arranged that upon operation of said brake controlling means in response to an emergency rate of reduction in brake pipe pressure said last means closes said by-pass communication, and upon operation of said brake controlling means in response to a reduction in brake pipe pressure at a rate less than an emergency rate said last means under short train conditions opens said by-pass communication.

3. In a fluid pressure brake for a train, in combination, a brake pipe, a communication to which fluid under pressure is adapted to be supplied for effecting an application of the brakes at a rate dependent upon the rate of such supply, brake controlling means operative upon a reduction in brake pipe pressure to supply fluid under pressure to said communication at a rate dependent upon the rate of brake pipe reduction, choke means disposed between said brake controlling means and said communication and operative to restrict the rate of flow of fluid under pressure supplied to said communication by said brake controlling means, and means for establishing a by-pass communication around said choke means to provide for flow of fluid to said communication in accordance with the rate of supply of fluid under pressure by said brake controlling means, said last means being governed by two opposing fluid pressures, one of which is that present in said communication and the other of which is that present in a chamber, said parts being so arranged that upon operation of said brake controlling means in response to an emergency rate of reduction in brake pipe pressure said last means closes said by-pass communication, and upon operation of said brake controlling means in response to a reduction in brake pipe pressure at a rate less than an emergency rate said last means under short train conditions opens said by-pass communication, and manually operated means for controlling the pressure in said chamber to modify the operation of said last means.

4. In a fluid pressure brake, in combination, a brake pipe, a communication to which fluid under pressure is adapted to be supplied for effecting an application of brakes at a rate dependent upon the rate of such supply, brake controlling means operative upon a reduction in brake pipe pressure to supply fluid under pressure for supply to said communication at a rate dependent upon the rate of brake pipe reduction, choke means for restricting the flow of fluid under pressure from said brake controlling means to said communication upon an emergency reduction in brake pipe pressure and delay valve means normally closing a by-pass around said choke means and operative to open said by-pass to provide an increase in pressure in said communication in accordance with the rate of supply of fluid under pressure by said brake controlling means, said delay valve means being controlled by the cooperative action of the pressure of fluid supplied by said brake controlling means and that acting in said communication and the opposing pressure of fluid in a chamber adapted to be either vented or supplied with fluid under pressure by said brake controlling means at a rate in accordance with the rate of reduction in brake pipe pressure, said delay valve means being operative by fluid under pressure supplied to said chamber upon operation of said brake controlling means in response to an emergency reduction in brake pipe pressure to close said by-pass and to open said by-pass upon operation of said brake controlling means in response to a reduction in brake pipe pressure at a rate less than an emergency rate provided said choke means restricts the flow of fluid under pressure from said brake controlling means to said communication, said delay valve means being also operative by the pressure of fluid supplied by said brake controlling means when said chamber is vented, to open said by-pass provided said choke means restricts the flow of fluid under pressure to said communication regardless of the rate of reduction in brake pipe pressure, and means adjustable manually to one position to open said chamber to the atmosphere and to another position to connect said chamber to said brake controlling means.

5. In a fluid pressure brake, in combination, a brake pipe, a communication to which fluid under pressure is adapted to be supplied for effecting an application of brakes at a rate dependent upon the rate of such supply, brake controlling means operative upon a reduction in brake pipe pressure to supply fluid under pressure for supply to said communication at a rate dependent upon the rate of brake pipe reduction, choke means for restricting the flow of fluid under pressure from said brake controlling means to said communication upon an emergency reduction in brake pipe pressure, and movable abutment means normally closing a by-pass around said choke means and operative to open said by-pass to provide for flow of fluid under pressure to said communication at the rate of supply by said brake controlling means, said abutment means having one portion of one face subject to pressure of fluid in said communication and another portion of said one face subject to said pressure of fluid supplied by said brake controlling means, and having its opposite face subject to pressure of fluid supplied by said brake controlling means to an adjacent chamber, and being operative by the fluid under pressure supplied to said chamber upon an emergency reduction in brake pipe pressure to close said by-pass and operative by the pressures of fluid acting on said one face upon a reduction in brake pipe pressure at a rate less than an emergency rate to open said by-pass provided said choke means restricts the flow of fluid under pressure from said brake controlling means to said communication.

6. In a fluid pressure brake, in combination, a brake pipe, a communication to which fluid under pressure is adapted to be supplied for effecting an application of brakes at a rate dependent upon the rate of such supply, brake controlling means operative upon a reduction in brake pipe pressure to supply fluid under pressure for supply to said communication at a rate dependent upon the rate of brake pipe reduction, choke means for restricting the flow of fluid under pressure from said brake controlling means to said communication upon an emergency reduction in brake pipe pressure, and movable abutment means normally closing a by-pass around said choke means and operative to open said by-pass to provide for flow of fluid under pressure to said communication at the rate of supply by said brake controlling means, said abutment means having one portion of one face subject to pressure of fluid in said communication and another portion of said one face subject to said pressure of fluid supplied by said brake controlling means, and having its opposite face subject to pressure of fluid supplied by said brake controlling means to an adjacent chamber, and being operative by the fluid under pressure supplied to said chamber upon an emergency reduction in brake pipe pressure to close said by-pass and operative by the pressures of fluid acting on said one face upon a reduction in brake pipe pressure at a rate less than an emergency rate to open said by-pass provided said choke means restricts the flow of fluid under pressure from said brake controlling means to said communication, and manually operated valve means having one position establishing communication between said chamber and brake controlling means and operative to another position to close said communication and to vent said chamber to thereby render said valve means operative to open said by-pass whenever said choke means restricts the flow of fluid under pressure from said brake controlling means to said communication.

7. In a fluid pressure brake, in combination, a brake pipe, a communication to which fluid under pressure is adapted to be supplied for effecting an application of brakes at a rate dependent upon the rate of such supply, brake controlling means operative upon a reduction in brake pipe pressure to supply fluid under pressure for supply to said communication at a rate dependent upon the rate of brake pipe reduction, choke means for restricting the flow of fluid under pressure from said brake controlling means to said communication upon an emergency reduction in brake pipe pressure, and movable abutment means normally closing a by-pass around said choke means and operative to open said by-pass to provide for flow of fluid under pressure to said communication at the rate of supply by said brake controlling means, said abutment means having one portion of one face subject to pressure of fluid in said communication and another portion of said one face subject to said pressure of fluid supplied by said brake controlling means, and having its opposite face subject to pressure of fluid supplied by said brake controlling means to an adjacent chamber, and being operative by the fluid under pressure supplied to said chamber upon an emergency reduction in brake pipe pressure to close said by-pass and operative by the pressures of fluid acting on said one face upon a reduction in brake pipe pressure at a rate less than an emergency rate to open said by-pass provided said choke means restricts the flow of fluid under pressure from said brake controlling means to said communication, a delay pipe, double check valve means controlling communication between said chamber and brake controlling means and operative by fluid pressure in said delay pipe to open the last named communication, and operative by fluid pressure supplied by said brake controlling means when said pipe is vented to close said last named communication and to connect said chamber to said pipe, and a delay valve movable manually to one position to vent said pipe and to another position for supplying fluid under pressure to said pipe.

8. In a fluid pressure brake, in combination, a brake pipe, a communication to which fluid under pressure is adapted to be supplied for effecting an application of brakes at a rate dependent upon the rate of such supply, brake controlling means operative upon an emergency reduction in pressure in said brake pipe to supply fluid under pressure at a normal emergency rate for supply to said communication to effect a normal emergency application of brakes and operative upon a reduction in brake pipe pressure at a rate less than an emergency rate to supply fluid under pressure at a correspondingly slower rate for supply to said communication to effect an application of the brakes, delay choke means for reducing the supply of fluid under pressure to said communication to a rate less than said normal emergency rate, a by-pass around said delay choke means for rendering said delay choke means ineffective, valve means controlling said by-pass and controlled by the cooperative action of the pressures of fluid supplied by said brake controlling means and acting in said communication and the opposing pressure of fluid in a chamber supplied by said brake controlling means at a rate dependent upon the rate of brake pipe reduction, said valve means being operative by the pressure of fluid supplied to said chamber upon an emergency rate of reduction in brake pipe pressure to close said by-pass and operative by said cooperating pressures upon a slower rate of supply of fluid by said brake controlling means to open said by-pass provided said slower rate of supply of fluid is restricted by said delay choke means in flowing to said communication.

9. In a fluid pressure brake, in combination, a brake pipe, a communication to which fluid under pressure is adapted to be supplied for effecting an application of brakes at a rate dependent upon the rate of such supply, brake controlling means operative upon an emergency reduction in pressure in said brake pipe to supply fluid under pressure at a normal emergency rate for supply to said communication to effect a normal emergency application of brakes and operative upon a reduction in brake pipe pressure at a rate less than an emergency rate to supply fluid under pressure at a correspondingly slower rate for supply to said communication to effect an application of the brakes, delay choke means for reducing the supply of fluid under pressure to said communication to a rate less than said normal emergency rate, a by-pass around said delay choke means for rendering said delay choke means ineffective, valve means controlling said by-pass and controlled by the cooperative action of the pressures of fluid supplied by said brake controlling means and acting in said communication and the opposing pressure of fluid in a chamber connected to said brake controlling means for supply with fluid under pressure therefrom, said valve means being operable by the cooperating fluid pressures to open said by-pass on a service rate of reduction in brake pipe pressure providing the rate of supply of fluid by said brake controlling means is such that said delay choke means restricts the flow of fluid to said commnication, emergency choke means for controlling said normal emergency rate of supply of fluid to said communication, the connection between said chamber and said brake controlling means being ahead of said emergency choke means to thereby provide an increase in pressure in said chamber at a faster rate than the opposing cooperating pressures increase in effecting an emergency application of the brakes for thereby effecting operation of said valve means to close said by-pass.

10. In a fluid pressure brake, in combination, a brake pipe, a communication to which fluid under pressure is adapted to be supplied for effecting an application of brakes at a rate dependent upon the rate of such supply, service brake controlling means responsive to either a service or an emergency reduction in brake pipe pressure to supply fluid under pressure at a service rate to a passage for supply to said communication, emergency brake controlling means operative upon an emergency reduction in brake pipe pressure to supply fluid under pressure to said passage for supply to said communication, emergency choke means arranged to control the rate of flow of fluid under pressure from said emergency brake controlling means to said passage, the supply of fluid to said passage by both said brake controlling means upon an emergency reduction in brake pipe pressure being adapted to provide a normal rate of emergency brake application, delay choke means arranged to retard the flow of fluid under pressure from said passage to said communication to provide an emergency application of brakes at a rate slower than said normal rate, a by-pass around said delay choke means for rendering same ineffective, valve means controlling said by-pass, said valve means being controlled by the cooperative action of the pressures of fluid in said passage and in said communication and the opposing pressure of fluid in a chamber connected with said passage and being operative by the pressure of fluid in said chamber to close said by-pass in effecting an emergency application of brakes and being operative by the cooperative action of pressures in said passage and communication to open said by-pass in effecting a service application of the brakes providing the fluid supplied by said service brake control means to said passage is restricted by said choke means in flowing to said communication.

11. In a fluid pressure brake, in combination, a brake pipe, a communication to which fluid under pressure is adapted to be supplied for effecting an application of brakes at a rate dependent upon the rate of such supply, service brake controlling means responsive to either a service or an emergency reduction in brake pipe pressure to supply fluid under pressure at a service rate to a passage for supply to said communication, emergency brake controlling means operative upon an emergency reduction in brake pipe pressure to supply fluid under pressure to said passage for supply to said communication, emergency choke means arranged to control the rate of flow of fluid under pressure from said emergency brake controlling means to said passage, the supply of fluid to said passage by both said brake controlling means upon an emergency reduction in brake pipe pressure being adapted to provide a normal rate of emergency brake application, delay choke means arranged to retard the flow of fluid under pressure from said passage to said communication to provide an emergency application of brakes at a rate slower than said normal rate, a by-pass around said delay choke means for rendering same ineffective, valve means controlling said by-pass, said valve means being controlled by the cooperative action of the pressures of fluid in said passage and in said communication and the opposing pressure of fluid in a chamber connected with said passage and being operative by the pressure of fluid in said chamber to close said by-pass in effecting an emergency application of brakes and being operative by the cooperative action of pressures in said passage and communication to open said by-pass in effecting a service application of the brakes providing the fluid supplied by said service brake control means to said passage is restricted by said choke means in flowing to said communication, said emergency choke means being so located in said passage as to restrict flow of fluid under pressure to said chamber as well as to said delay choke means.

12. In a fluid pressure brake, in combination, a brake pipe, a communication to which fluid under pressure is adapted to be supplied for effecting an application of brakes at a rate dependent upon the rate of such supply, service brake controlling means responsive to either a service or an emergency reduction in brake pipe pressure to supply fluid under pressure at a service rate to a passage for supply to said communication, emergency brake controlling means operative upon an emergency reduction in brake pipe pressure to supply fluid under pressure to said passage for supply to said communication, emergency choke means arranged to control the rate of flow of fluid under pressure from said emergency brake controlling means to said passage, the supply of fluid to said passage by both said brake controlling means upon an emergency reduction in brake pipe pressure being adapted to provide a normal rate of emergency brake application, delay choke means arranged to retard the flow of fluid under pressure from said passage to said communication to provide an emergency application of brakes at a rate slower than said normal rate, a by-pass around said delay choke means for rendering same ineffective, valve means controlling said by-pass, said valve means being controlled by the cooperative action of the pressures of fluid in said passage and in said communication and the opposing pressure of fluid in a chamber connected with said passage and being operative by the pressure of fluid in said chamber to close said by-pass in effecting an emergency application of brakes and being operative by the cooperative action of pressures in said passage and communication to open said by-pass in effecting a service application of the brakes providing the fluid supplied by said service brake control means to said passage is restricted by said choke means in flowing to said communication, said emergency choke means being so located in said passage as to restrict the supply of fluid under pressure to said delay choke means but not to said chamber from said emergency brake controlling means.

13. In a fluid pressure brake, in combination, a brake pipe, a communication to which fluid under pressure is adapted to be supplied for effecting an application of brakes at a rate dependent upon the rate of such supply, service brake controlling means responsive to either a service or an emergency reduction in brake pipe pressure to supply fluid under pressure at a service rate to a passage for supply to said communication, emergency brake controlling means operative upon an emergency reduction in brake pipe pressure to supply fluid under pressure to said passage for supply to said communication, emergency choke means arranged to control the rate of flow of fluid under pressure from said emergency brake controlling means to said passage, the supply of fluid to said passage by both said brake controlling means upon an emergency reduction in brake pipe pressure being adapted to provide a normal rate of emergency brake application, delay choke means arranged to retard the flow of fluid under pressure from said passage to said communication to provide an emergency application of brakes at a rate slower than said normal rate, a by-pass around said delay choke means for rendering same ineffective, valve means controlling said by-pass, said valve means being controlled by the cooperative action of the pressures of fluid in said passage and in said communication and the opposing pressure of fluid in a chamber connected with said passage and being operative by the pressure of fluid in said chamber to close said by-pass in effecting an emergency application of brakes and being operative by the cooperative action of pressures in said passage and communication to open said by-pass in effecting a service application of the brakes providing the fluid supplied by said service brake control means to said passage is restricted by said choke means in flowing to said communication, and manually controlled means for controlling communication between said chamber and passage and operative to either open said communication or to close same and connect said chamber to the atmosphere for thereby rendering said valve means operable to open said by-pass whenever said delay choke means acts to retard the flow of fluid under pressure from said passage to said communication.

14. In a fluid pressure brake, in combination, a brake pipe, a communication through which fluid under pressure is adapted to be supplied for effecting an application of brakes at a rate dependent upon the rate of such supply brake controlling means operative upon an emergency reduction in pressure in said brake pipe to supply fluid under pressure at a normal emergency rate to a passage for supply to said communication to effect an emergency application of the brakes, said brake controlling means being also operative upon a reduction in brake pipe pressure at a rate less than said emergency rate to supply fluid under pressure to said passage at a corresponding rate for supply to said communication to effect an application of brakes at a corresponding rate, choke means arranged to retard the flow of fluid under pressure from said passage to said communication in effecting an emergency application of the brakes, a by-pass around said choke means for rendering said choke means ineffective, a chamber, valve means normally closing said by-pass and adapted to be operated by the cooperative action of pressures in said passage and communication when said chamber is vented to open said by-pass, said valve means being operative when fluid under pressure is supplied to said chamber to close said by-pass, said brake controlling means being operative in effecting an emergency application of brakes to supply fluid under pressure to said chamber and at all other times to connect said chamber to the atmosphere.

15. In a fluid pressure brake, in combination, a brake pipe, a communication through which fluid under pressure is adapted to be supplied for effecting an application of brakes at a rate dependent upon the rate of such supply, brake controlling means operative upon an emergency reduction in pressure in said brake pipe to supply fluid under pressure at a normal emergency rate to a passage for supply to said communication to effect an emergency application of the brakes, said brake controlling means being also operative upon a reduction in brake pipe pressure at a rate less than said emergency rate to supply fluid under pressure to said passage at a corresponding rate for supply to said communication to effect an application of brakes at a corresponding rate, choke means arranged to retard the flow of fluid under pressure from said passage to said communication in effecting an emergency application of the brakes, a by-pass around said choke means for rendering said choke means ineffective, a chamber, valve means normally closing said by-pass and adapted to be operated by the cooperative action of pressures in said passage and communication when said chamber is vented to open said by-pass, said valve means being operative when fluid under pressure is supplied to said chamber to close said by-pass, said brake controlling means being operative in effecting an emergency application of brakes to supply fluid under pressure to said chamber and at all other times to connect said chamber to the atmosphere, valve means controlling communication between said chamber and brake controlling means and operable to close said communication and to open said chamber to the atmosphere, and manually operable means having one position for actuating the last named valve means to connect said chamber with said brake controlling means and another position for actuating the valve means for connecting said chamber with the atmosphere.

16. In a fluid pressure brake, in combination, a brake pipe, a communication to which fluid under pressure is adapted to be supplied for effecting an application of the brakes at a rate dependent upon the rate of such supply, brake controlling means operative upon a reduction in brake pipe pressure at an emergency rate to supply fluid under pressure to a passage at a corresponding rate for supply to said communication to effect an emergency application of brakes and operative upon a reduction in brake pipe pressure at a rate less than an emergency rate to supply fluid under pressure to said passage at a corresponding rate for supply to said communication to effect a service application of brakes, a safety valve device, said brake controlling means being operative in effecting a service application of the brakes to connect said safety valve device to said passage for limiting the pressure of fluid in said passage and communication, and being operative in effecting an emergency application of brakes to disconnect said passage from said safety valve device, choke means arranged in a communication between said passage and communication for retarding the flow of fluid under pressure from said passage to said communication in effecting an emergency application of brakes, a by-pass around said choke means for rendering said choke means ineffective, and valve means normally closing said by-pass and subject to the cooperative action of pressures of fluid in said passage and communication and the opposing pressure of fluid in a chamber communicating with said passage, said valve means being operative by fluid supplied to said chamber in effecting an emergency application of the brakes to close said by-pass and being operative by the pressures in said passage and communication to open said by-pass upon a reduction in the brake pipe pressure at a rate less than an emergency rate providing said choke means restricts the supply of fluid under pressure from said passage to said communication.

17. In a fluid pressure brake, in combination, a brake pipe, a communication to which fluid under pressure is adapted to be supplied for effecting an application of the brakes at a rate dependent upon the rate of such supply, brake controlling means operative upon a reduction in brake pipe pressure at an emergency rate to supply fluid under pressure to a passage at a corresponding rate for supply to said communication to effect an emergency application of brakes and operative upon a reduction in brake pipe pressure at a rate less than an emergency rate to supply fluid under pressure to said passage at a corresponding rate for supply to said communication to effect a service application of brakes, a safety valve device, said brake controlling means being operative in effecting a service application of the brakes to connect said safety valve device to said passage for limiting the pressure of fluid in said passage and communication, and being operative in effecting an emergency application of brakes to disconnect said passage from said safety valve device, choke means arranged in a communication between said passage and communication for retarding the flow of fluid under pressure from said passage to said communication in effecting an emergency application of brakes, a by-pass around said choke means for rendering said choke means ineffective, and valve means normally closing said by-pass and subject to the cooperative action of pressures of fluid in said passage and communication and the opposing pressure of fluid in a chamber communicating with said passage, said valve means being operative by fluid supplied to said chamber in effecting an emergency application of the brakes to close said by-pass and being operative by the pressures in said passage and communication to open said by-pass upon a reduction in the brake pipe pressure at a rate less than an emergency rate providing said choke means restricts the supply of fluid under pressure from said passage to said communication, and manually controlled valve means controlling communication between said chamber and passage and operative to either close same or to open said chamber to the atmosphere for thereby rendering said valve means operable by the pressure of fluid supplied to said passage to open said by-pass providing said choke means restricts the flow of fluid under pressure from said passage to said communication.

18. In a fluid pressure brake, in combination, a brake pipe, a safety valve device, a communication to which fluid under pressure is adapted to be supplied for effecting an application of brakes at a rate dependent upon the rate of such supply, a service application valve device operative upon a service reduction in brake pipe pressure to supply fluid under pressure to a passage at a service rate for supply to said communication to effect a service application of brakes, an emergency valve device, both of said valve devices being operative upon an emergency reduction in brake pipe pressure to supply fluid under pressure to said passage for supply to said communication to effect an emergency application of brakes, said emergency valve device connecting said safety valve device to said passage for limiting the pressure of fluid therein in effecting a service application of brakes and disconnecting said safety valve device from said passage in effecting an emergency application of brakes, choke means arranged to retard the flow of fluid under pressure from said passage to said communication in effecting an emergency application of brakes to a rate less than the rate of supply to said passage by said valve devices, a by-pass around said choke means for rendering said choke means ineffective, delay valve means controlling said by-pass and subject when closing said by-pass to the cooperative action of the pressures of fluid in said passage and communication, said delay valve means being subject to the opposing action of fluid pressure in a chamber supplied by said emergency valve device in effecting an emergency application of the brakes and vented at all other times to thereby render said delay valve means operative to close said by-pass in effecting an emergency application of brakes and to open said by-pass in effecting a service application of brakes, and manually controlled valve means controlling communication between said chamber and said emergency valve device and operative to close same and to connect said chamber with the atmosphere for thereby rendering said delay valve means non-operable in effecting an emergency application of brakes as well as in effecting a service application of brakes.

19. In a fluid pressure brake, in combination, a brake pipe, a safety valve device, a communication to which fluid under pressure is adapted to be supplied for effecting an application of brakes at a rate dependent upon the rate of such supply, a service application valve device operative upon a service reduction in brake pipe pressure to supply fluid under pressure to a passage at a service rate for supply to said communication to effect a service application of brakes, an emergency valve device, both of said valve devices being operative upon an emergency reduction in brake pipe pressure to supply fluid under pressure to said passage for supply to said communication to effect an emergency application of brakes, said emergency valve device connecting said safety valve device to said passage for limiting the pressure of fluid therein in effecting a service application of brakes and disconnecting said safety valve device from said passage in effecting an emergency application of brakes, choke means arranged to retard the flow of fluid under pressure from said passage to said communication in effecting an emergency application of brakes to a rate less than the rate of supply to said passage by said valve devices, a by-pass around said choke means for rendering said choke means ineffective, delay valve means controlling said by-pass and subject when closing said by-pass to the cooperative action of the pressures of fluid in said passage and communication, said delay valve means being subject to the opposing action of fluid pressure in a chamber adapted to be connected with said passage for rendering said valve means operable by the pressure of fluid in said passage in effecting an emergency application of brakes to close said by-pass and to render same operable to open said by-pass by the pressures of fluid in said passage and communication upon the supply of fluid under pressure to said passage in effecting a service application of brakes, and manually adjustable valve means controlling communication between said chamber and passage and operable to close same and to connect said chamber with the atmosphere for thereby rendering said delay valve means operable by the pressures of fluid in said passage and communication to open said by-pass in effecting an emergency application of brakes.

DONALD L. McNEAL.